Nov. 30, 1948.  H. E. WARREN  2,454,902
SPEED GOVERNOR
Filed July 14, 1944
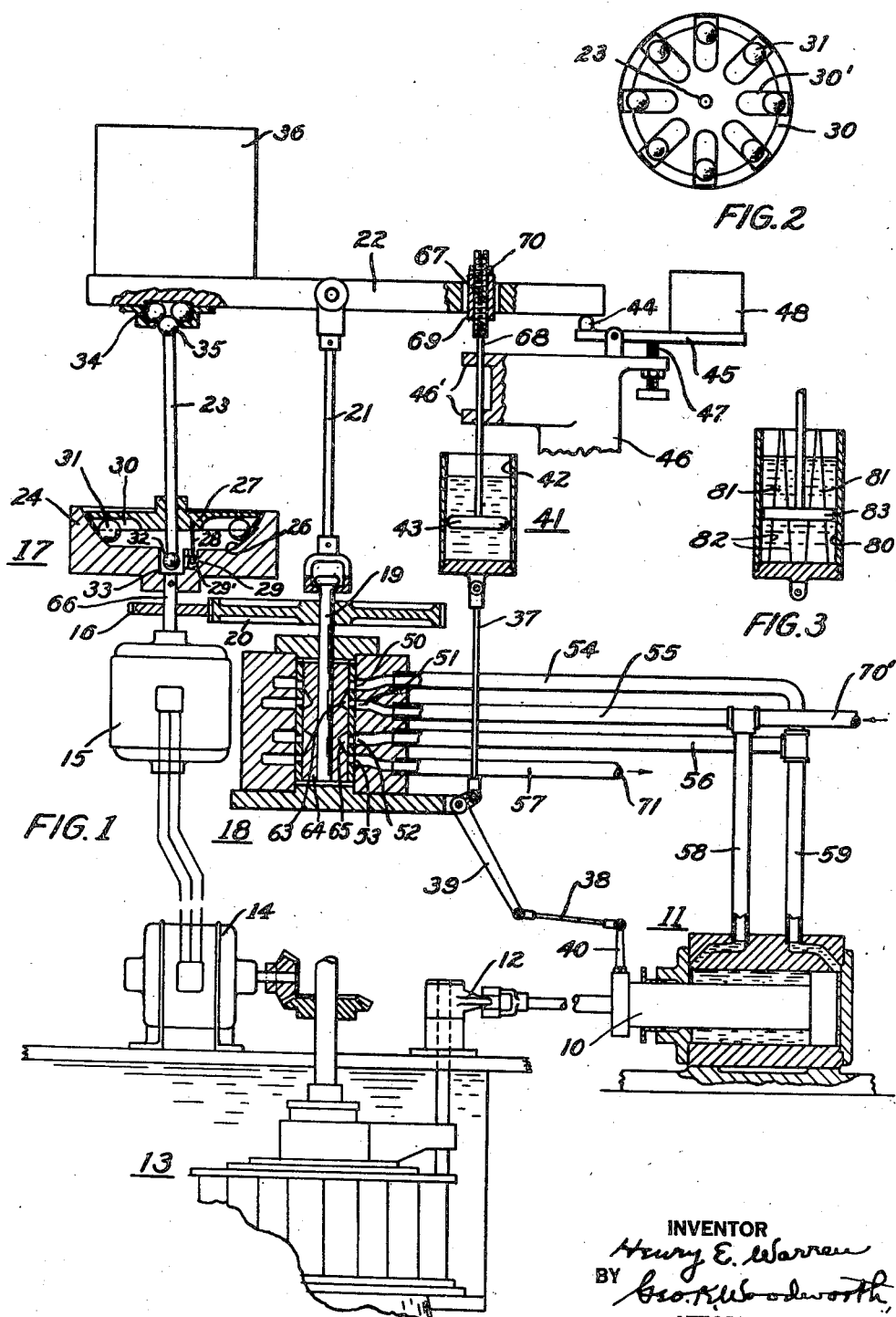
INVENTOR
Henry E. Warren
BY Geo. K. Woodworth
ATTORNEY

UNITED STATES PATENT OFFICE 2,454,902

SPEED GOVERNOR

Henry E. Warren, Ashland, Mass.

Application July 14, 1944, Serial No. 544,996

3 Claims. (Cl. 264—17)

This invention relates to speed governors and its primary object is to provide an especially simple and very sensitive form of speed measuring and controlling device which is quick acting and sensitive, for the purpose of regulating the speed of a prime mover.

Other objects will appear from the detailed description of the particular embodiment of the invention selected to disclose the underlying principle thereof.

In the drawings,

Figure 1 is a vertical section somewhat schematic in nature of a complete governor embodying my invention.

Fig. 2 is an under plan view of a centrifugal device forming part of a tachometer.

Fig. 3 is a sectional view of a dash pot having an internally slotted cylinder which may be used in place of the dash pot shown in Fig. 1.

The piston 10 of the servomotor 11, Fig. 1, is connected by the slotted link 12 to the gate mechanism through which water is delivered to the turbine 13, the latter being illustrative of any prime mover the speed of which is to be governed by the herein described governor. Driven by the prime mover is an alternating current generator 14, which feeds the synchronous motor 15 on the shaft of which is mounted for rotation the pinion 16 and the tachometer 17. The axially movable and rotatable valve 18 is mounted for rotation on the shaft 19 rigidly secured to the gear 20 meshing with the pinion 16. The valve is connected by the rod 21 to the lever 22 and the axial movement thereof on over- or under-speed is effected by the tachometer which by the stem 23 is connected to said lever.

The tachometer comprises a member 24 mounted for rotation on the shaft 66 of the motor 15. The rotatable member 24 is provided with a cavity having an upwardly and outwardly flaring wall 26 the surface of which, preferably, is a surface of revolution. Disposed within said cavity is a disc or abutment 27 loosely coupled to member 24 by the pin 28. The lower end of pin 28 is preferably provided with an enlarged spherical surface 29 which co-operates with bore 29' in member 24. This mode of connection insures rotation of abutment 27 with member 24 while permitting axial movement between them with minimum friction, and also permitting inclination of the axes of rotation of disc 27 and member 24 to each other without binding.

A ball separator or retainer 30 is provided, and, in the present instance, the lower face of the disc is shown as grooved radially to afford radially extending compartments 30' (Fig. 2), in each of which is disposed a ball 31, each ball being disposed for co-operation with the surface 26 aforesaid. The stem 23, secured to and rotating with the disc 27, is guided in its axial movement without angular restraint by the ball 32 in which said stem terminates, said ball co-operating with the upper end of the bore 33 formed in the rotatable member 24.

The pivotal connection of the stem 23 and lever 22 preferably is formed by the anti-friction ball joint 34, consisting of four balls, two of which are shown, secured in a cavity on the under-side of the lever 22 and the ball 35 attached to the upper end of the stem.

The precise shape of surface 26 can, if desired, be selected so that the vertical force upon the disc 27 due to the centrifugal action upon the balls will be the same over the entire range of the radial distance of the balls from the center of rotation. In that case the valve may move throughout its whole range for the slightest departure in the speed of the prime mover from its normal value, which means, of course, that its governor is exceedingly sensitive. Such a governor may be designated as isochronous.

The stem 23 is so positioned that there will be a small angle between its axis and the axis of the rotatable member 24. There will, therefore, be a small angle between the plane of the upper surface of the disc 27 and the plane of the top of the member 24. Due to this tipping, each of the balls 31 is substantially freed from restraint at least once in each revolution of the rotatable member 24, and this results in complete freedom of said balls and disc to assume a position exactly corresponding to the instantaneous speed of the prime mover at all times, whereby extremely precise governing is effected.

The tilting of the stem 23 need only be very slight, even one degree or less being sufficient to give freedom and sensitivity to the balls.

The lever 22 is weighted at the end to which the stem 23 is attached by the weight 36. Intermediate the point of attachment of the rod 21 to said lever and the right-hand end thereof (in the present instance) is a connection from the lever to the servomotor whereby the axial movement of the valve is modified to prevent over-movement of the latter.

This anti-racing connection consists, in the present instance, of the links 37, 38, the bell crank 39, and the post 40 connected to the servomotor piston 10. Included within this anti-racing connection is a dash pot 41 which performs the usual well-known function of a dash pot in an anti-racing connection. In the present instance, the dash pot comprises a cylinder, the inner wall of which has a slightly conical surface 42, and disposed within the cylinder is a piston 43 of circular cross section. As the piston 43 ascends, the fluid above its upper face may pass through the space between the piston and the wall of the cylinder into the space between the lower face of the piston and the bottom of the cylinder, and as the clearance between the periphery of the piston and the inner wall of the cylinder is gradually diminishing, the resistance imposed by the fluid to the movement of the piston will gradually and progressively increase.

The length of the piston rod connection at the point 67 on lever 22 to the piston 43 can be varied by means of the threaded engagement between rod 68 and the member 69 swiveled in lever 22. A nut 70 locks the rod 68 in place after adjustment. As a result of this adjustment the normal zone of travel of the piston with respect to the dash pot can be altered at will from the upper part of the dash pot where clearance is small to the lower part of the dash pot where clearance is large. Thus the speed of response of the dash pot to gate motion can be easily adjusted. It should also be noted that with this arrangement the dash pot effect may be greater when the turbine gates are nearly closed than when they are wide open or vice versa, depending upon whether the clearance space around the piston is greater at the top of the dash pot than at the bottom or vice versa.

The swiveled connection of the lever 22 and the rod 68 at the point 67 prevents any lateral motion of said lever and therefore is effective to maintain the tilt of the rod 23.

In Fig. 3 is shown a modified dash pot arrangement which produces the same effect as the slightly conical surface above described; this figure shows a portion of a cylindrical interior surface 80 in which are cut shallow grooves 81 with tapering sides 82. The piston 83 which co-operates with the surface 80 is closely fitted, so that oil passage from one side to the other is practically all through the grooves 81. As the piston 83 engages with different axial ranges of the surface 80, the resistance to oil flow past the piston will vary, producing the same results as those obtained with a slightly conical surface.

An adjustable stop may be provided for the right-hand end of the lever 22 and, in the present instance, such stop comprises the protuberance 44 on the end of the lever 45, which is pivoted in the bracket 46 and normally held down on the upper end of the adjusting screw 47 by the weight 48 disposed on the right-hand end of said lever. There are obvious advantages in such a gravity-actuated adjustable stop member over a resiliently actuated stop member.

Bracket 46 also carries guides 46' for the rod 68, which serve to hold the lever 22 in proper alignment.

The rotatable member 24, the valve 18, and the disc 27, together with the balls 31 thereto secured, are driven at the speed of the prime mover the speed of which is to be governed or at a speed proportional to that of said prime mover. The centrifugal force on the balls 31 forces them outwardly and upwardly against the opposition of the weight 36 and the weight of the other elements, including the valve. The weight of the system opposed by the upward movement of the disc 27 and stem 23 is selected to balance the upward force exerted on the lever at the speed which it is desired the prime mover should maintain, that is, the normal speed. As a result, the valve does not tend to move axially and remains in its neutral position so long as the normal speed is maintained. Any change from this speed causes an upward or downward movement of the disc 27 and a corresponding movement of the valve 18, which, as hereinafter explained, acts on the servomotor and causes the latter to vary the position of the gate or throttle of the prime mover. Over-motion of the valve is eliminated through the linkage and connections 37, 38, 39, 40, as above explained.

In the particular embodiment of the invention herein specifically described, the valve 18 is provided with ports 50, 51, 52, 53, connected by the piping 54, 55, 56, 57, 58, 59, to the servomotor, the pipe 55 being connected at 70' to a source of fluid under pressure (not shown), and the pipe 57 being connected at 71 to a sump (not shown).

When the speed of the prime mover is increased, due to load reduction, the valve will be moved upwardly by the tachometer-actuated lever 22 and the peripheral groove 63 in the valve body 64 will connect the ports 50, 51, whereupon there will be a flow of oil to the right-hand end of the servomotor cylinder via the pipe 55, ports 50, 51, and pipes 54, 59, and the piston 10 will move outwardly and reduce the gate or throttle opening. When the speed of the prime mover has been reduced to normal, the tachometer and the valve 18 will resume their normal positions.

When the speed of the prime mover is reduced due to load increase, the ports 52, 53, are connected by the groove 65 in the valve body and the piston will be moved to the right by constant pressure around the trunk piston rod, so as to increase the gate opening.

While the oil circulatory system and the valve shown in Fig. 1 are preferred by me because they have been found effective in practice for securing this result, it is to be understood that I do not limit my invention to use with said valve nor said circulatory system.

Having thus described an illustrative embodiment of my invention without, however, limiting the same thereto, what I claim and desire to secure by Letters Patent is:

1. A tachometer for measuring or controlling speed, comprising a rotatable cup-shaped member, a plurality of balls disposed within said member for co-operation with the interior wall thereof, an abutment resting upon said balls, the lower face of said abutment being constructed and arranged to afford retainers permitting limited motion of said balls upon rotation of said member, means loosely coupling said abutment to said member for rotary movement therewith and axial movement thereto, a stem secured to and rotatable with said abutment, the axis of said abutment and stem making a small angle with the axis of said member, an axially movable device, means connecting said stem to impart axial motion to said device, and means connecting said member to a rotatable mechanism the speed of which is to be measured or controlled.

2. In a tachometer, a rotatable member having a cavity with an upwardly and outwardly flaring wall, centrifugal means disposed in said cavity; said means comprising a ball separator disc having radially extending compartments, and a ball disposed in each of said compartments for co-operation with the wall of said cavity; means permitting each of said balls, upon rotation of said member, successively to roll freely during a portion of its rotational travel around the wall of said cavity, and means coupling said disc to said member for rotary movement therewith and axial movement thereto.

3. A tachometer for measuring or controlling speed, comprising a cup-shaped rotatable member, a plurality of balls disposed within said member for co-operation with the interior surface thereof, retainers constructed and arranged to permit limited motion of said balls upon rotation of said member, an abutment resting upon said balls, and means loosely coupling said abutment to said member for rotary movement therewith and axial movement thereto, the axis of said abutment being tilted at a small angle to the axis of said member.

HENRY E. WARREN.

REFERENCES CITED

The following references are of record in the file of this patent:

UNITED STATES PATENTS

| Number | Name | Date |
|---|---|---|
| 955,709 | Spratt | Apr. 19, 1910 |
| 1,103,891 | Pfau | July 14, 1914 |
| 1,106,434 | Woodward | Aug. 11, 1914 |
| 1,241,808 | Balough | Oct. 2, 1917 |
| 1,371,767 | Johnson | Mar. 15, 1921 |
| 1,544,238 | Kasley | June 30, 1925 |
| 1,583,610 | Scott | May 4, 1926 |
| 1,893,187 | Urbanek | Jan. 7, 1933 |
| 1,897,765 | Pohlke | Feb. 14, 1933 |
| 2,292,805 | Tippen | Aug. 11, 1942 |
| 2,306,696 | Hale | Dec. 29, 1942 |
| 2,319,654 | Adler | May 18, 1943 |